F. ADAM.
LOCKING MECHANISM.
APPLICATION FILED APR. 6, 1916. RENEWED JUNE 30, 1919.
1,329,572.
Patented Feb. 3, 1920.
6 SHEETS—SHEET 1.
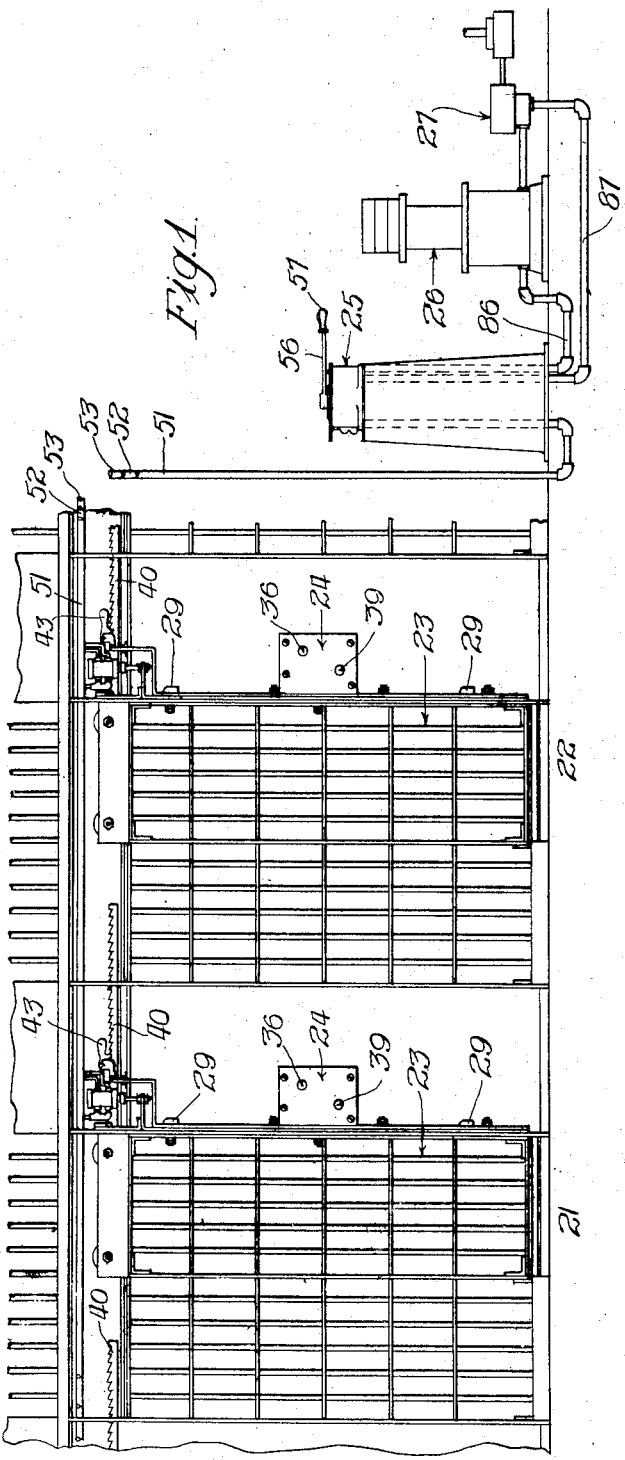
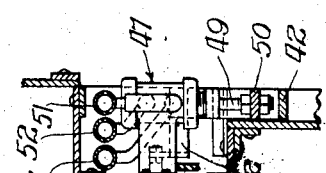
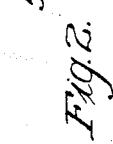
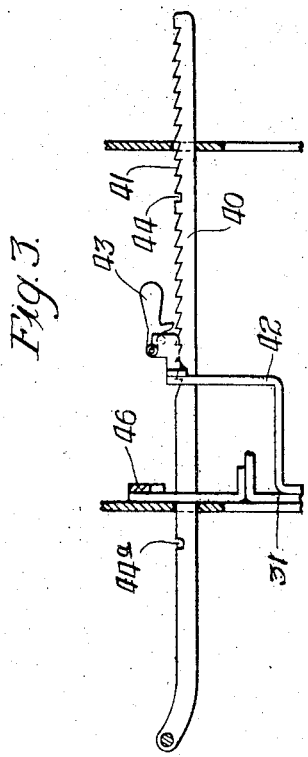
Witness:
J. E. Higham.
Inventor
Folger Adam
by Banning & Banning
Attys.

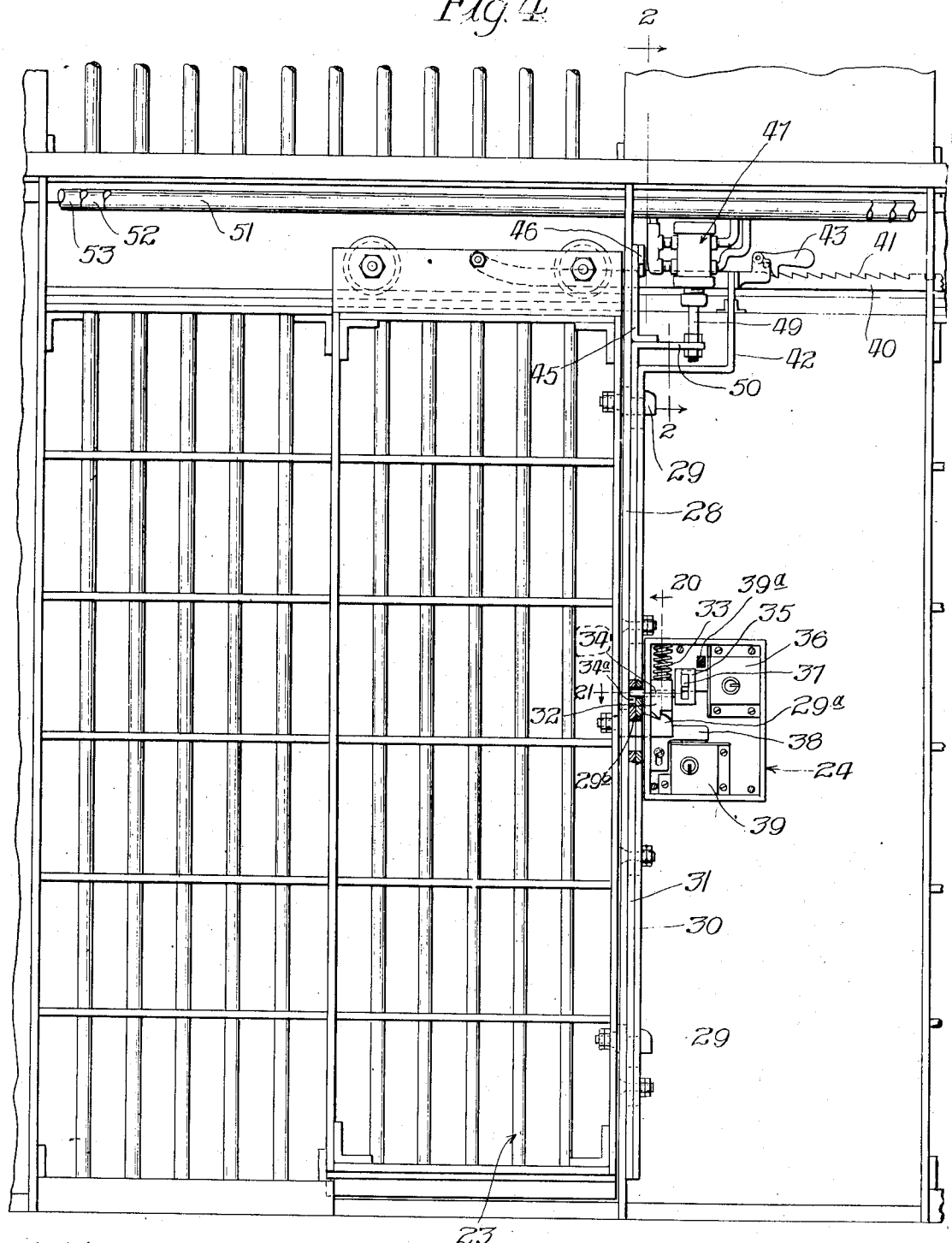

F. ADAM.
LOCKING MECHANISM.
APPLICATION FILED APR. 6, 1916. RENEWED JUNE 30, 1919.
1,329,572.
Patented Feb. 3, 1920.
6 SHEETS—SHEET 3.
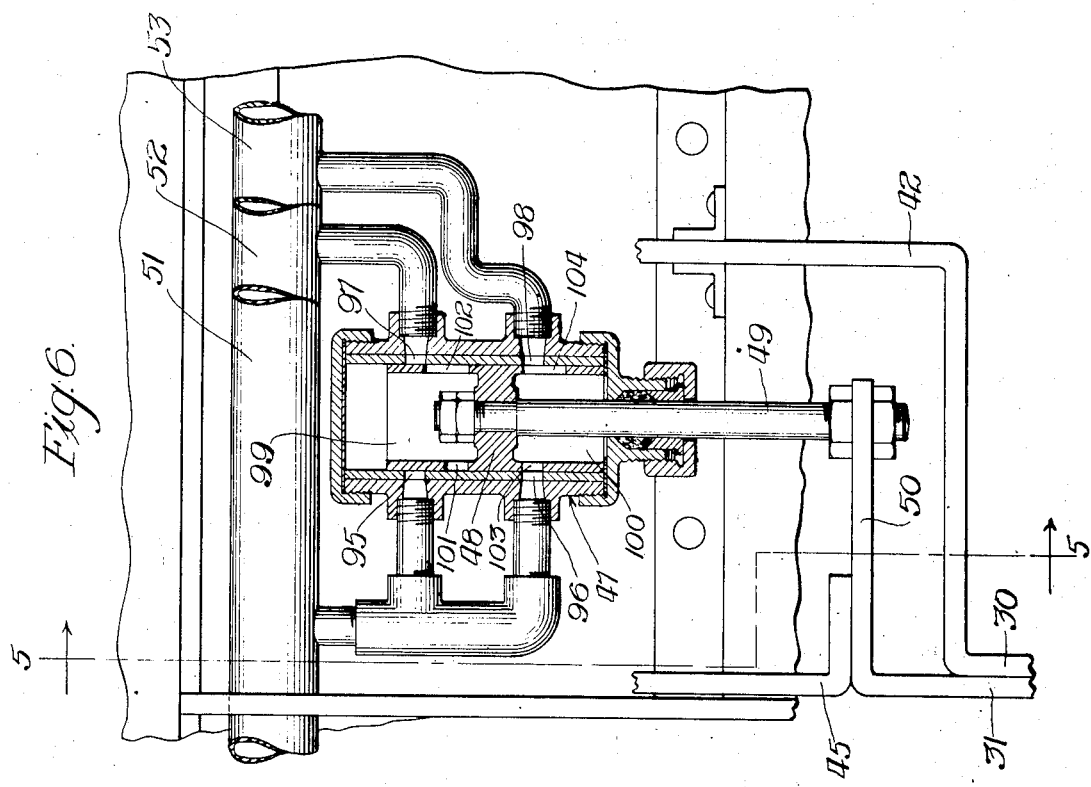
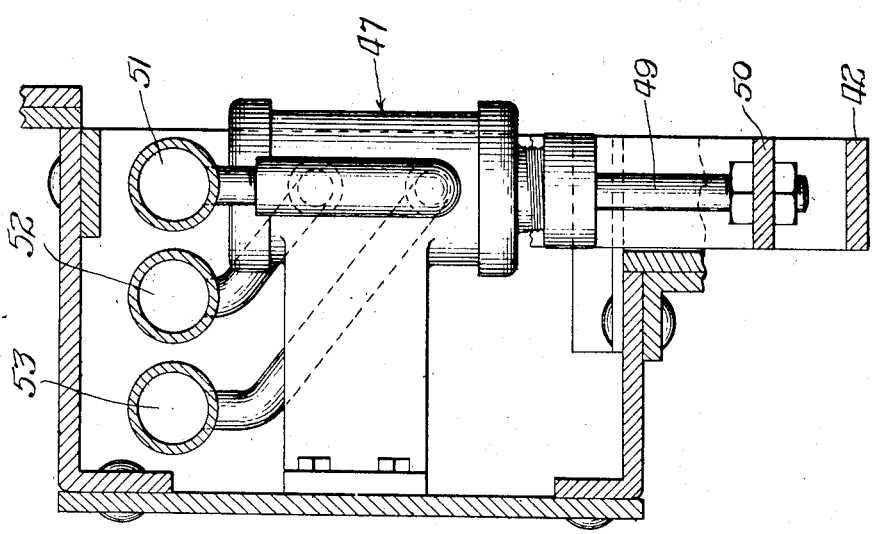
Witness:
J. C. Higham.
Inventor
Folger Adam
by Lanning Lanning
Attys.

F. ADAM.
LOCKING MECHANISM.
APPLICATION FILED APR. 6, 1916. RENEWED JUNE 30, 1919.
1,329,572.
Patented Feb. 3, 1920.
6 SHEETS—SHEET 4.
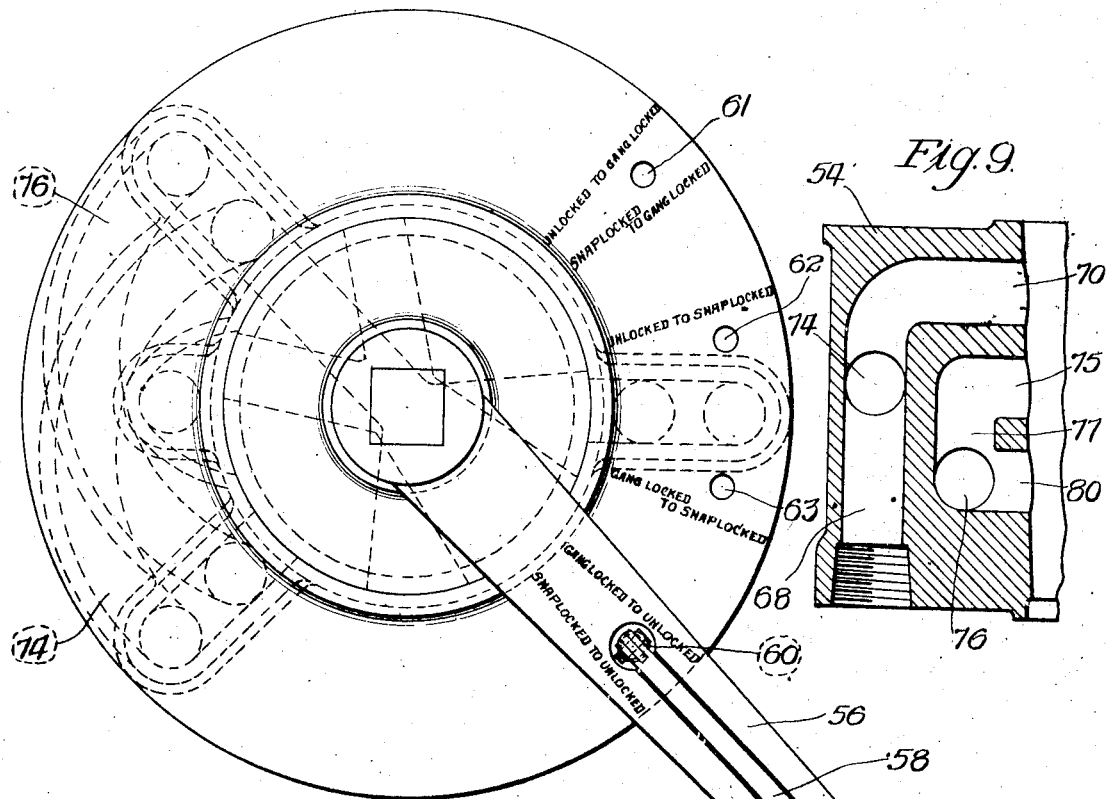
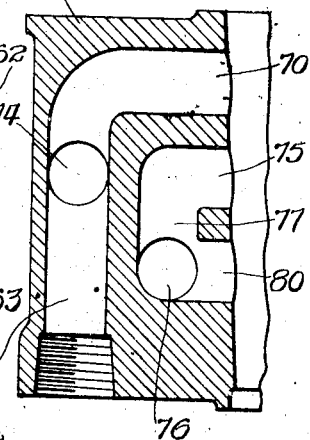
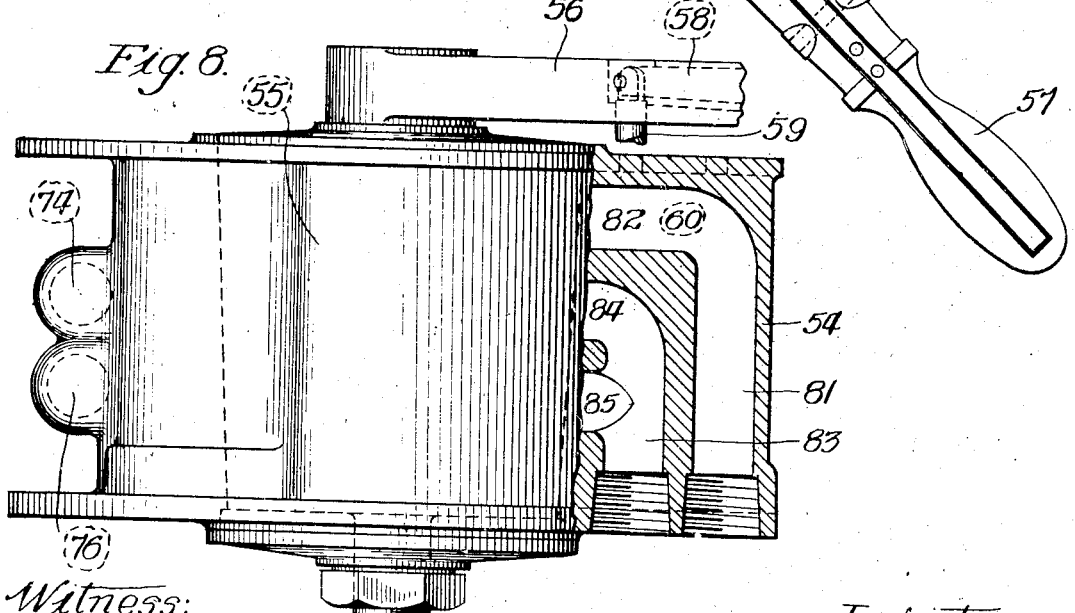
Witness:
J. C. Higham.
Inventor
Folger Adam
by Lanning & Lanning
Attys.

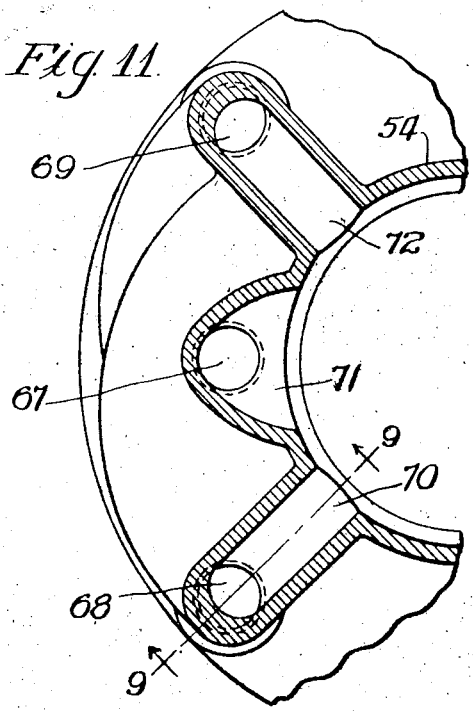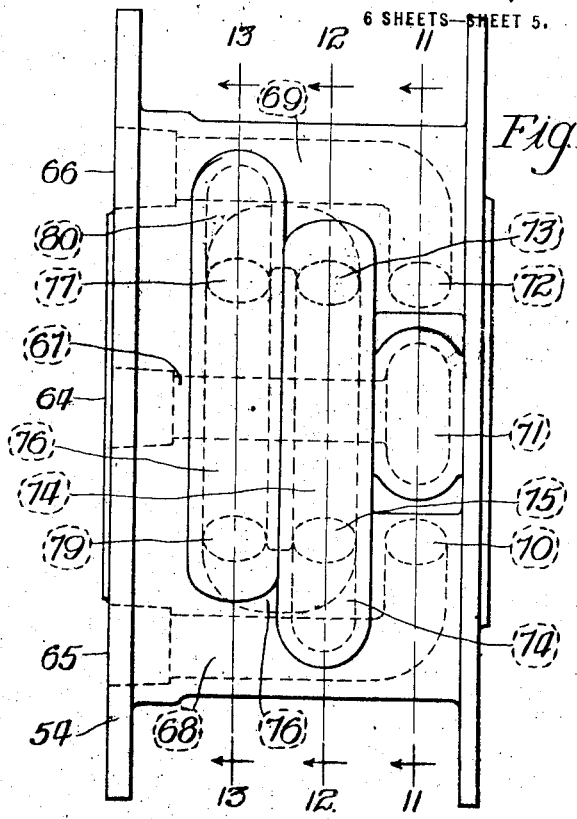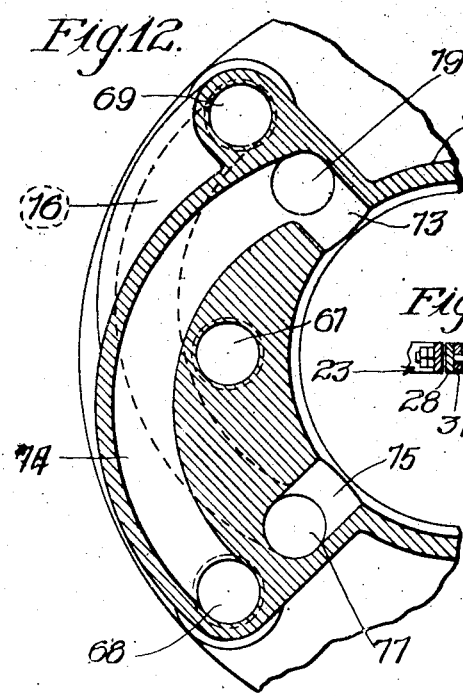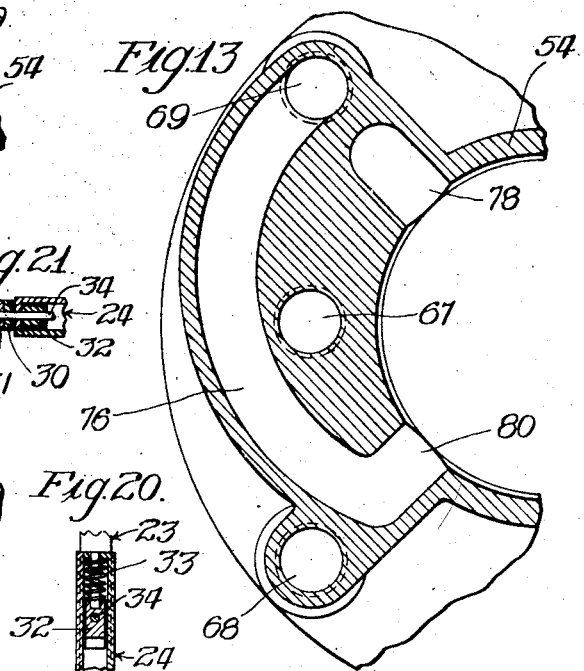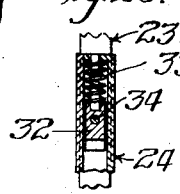

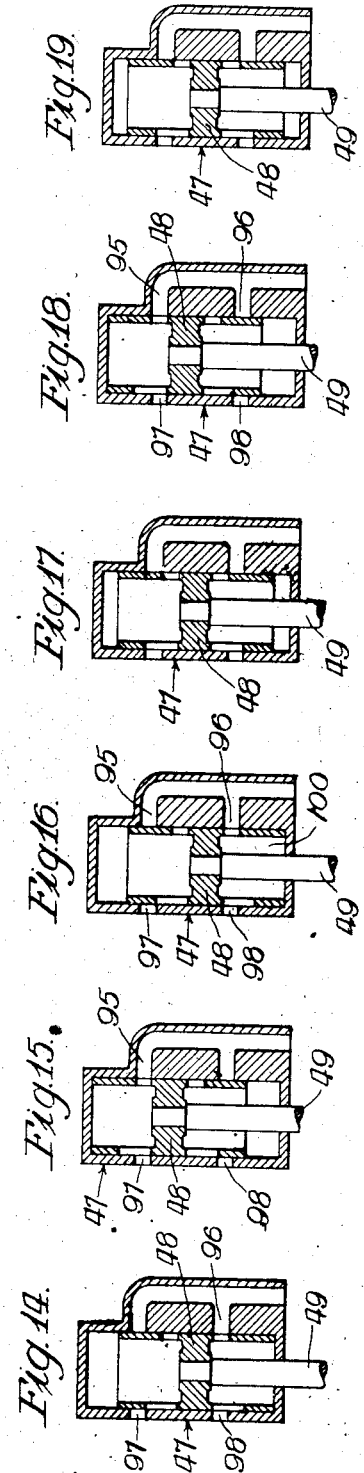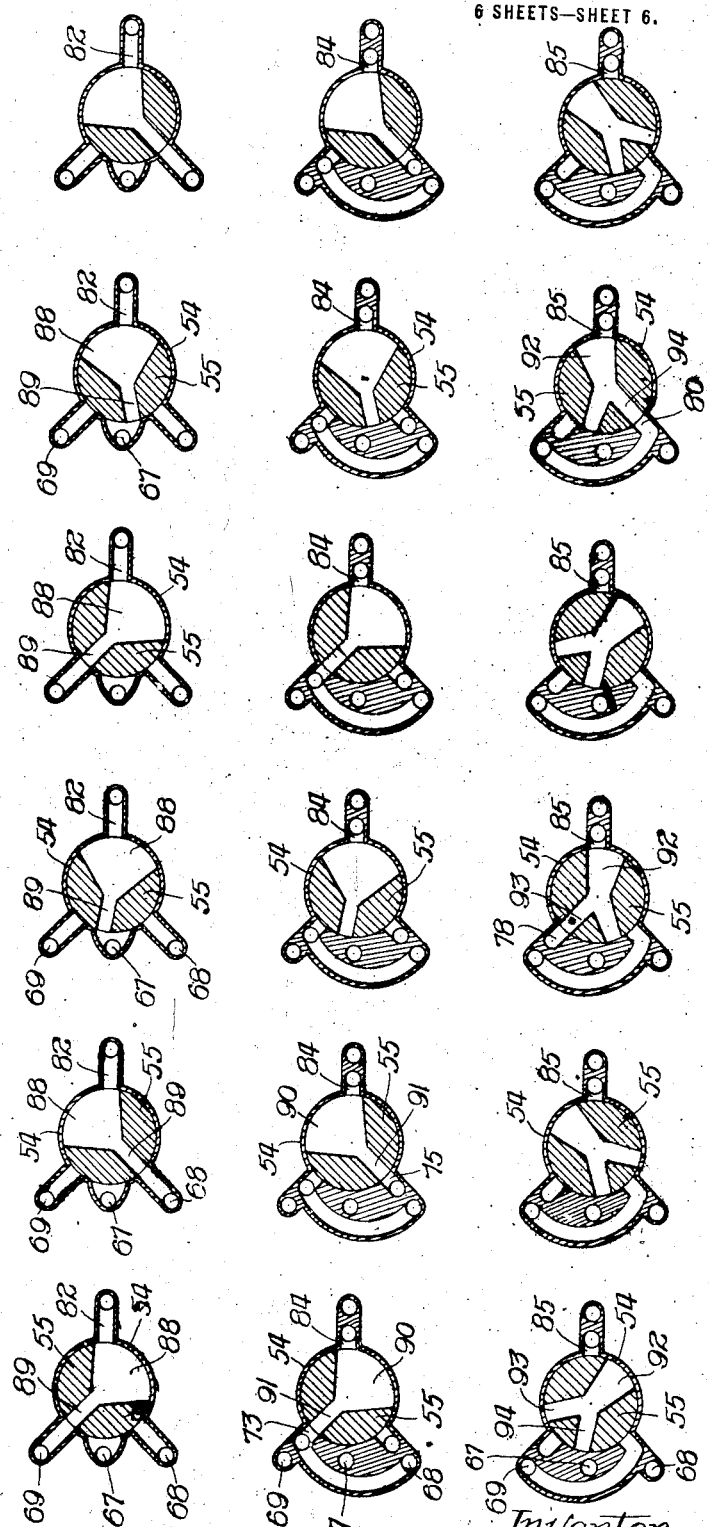

UNITED STATES PATENT OFFICE.

FOLGER ADAM, OF JOLIET, ILLINOIS.

LOCKING MECHANISM.

1,329,572.

Specification of Letters Patent.

Patented Feb. 3, 1920.

Application filed April 6, 1916, Serial No. 89,344. Renewed June 30, 1919. Serial No. 307,776.

*To all whom it may concern:*

Be it known that I, FOLGER ADAM, a citizen of the United States, residing at Joliet, in the county of Will and State of Illinois, have invented certain new and useful Improvements in Locking Mechanisms, of which the following is a specification.

The present invention has to do with improvements in locking mechanisms; and the features of invention herein disclosed are very well adapted for use in connection with jail locking mechanisms.

In the construction of jails and the like, it is desirable to be able to control the locking and unlocking as well as certain other conditions, in gangs of cell gates, so that all of said gates may be simultaneously or individually controlled as desired. In addition to the foregoing, it is desirable to be able to effect such control from a central point or station conveniently located for control by the warden or his representative. Certain forms of construction for this purpose have been devised in the past, and in order that some of the objects of the present invention may be more clearly understood, I will describe briefly some of the conditions to be met and the manner in which they have been met in the past.

In some of the previous jail constructions, it has been customary to build the cells in straight tiers on various levels. The control of the cell gates has generally been effected by means of levers or the like mounted at the ends of the gangs of cells in each tier. Such control has been conveniently effected because the necessary connections to the various cell locks could be made by the use of straight continuous bars which are moved back and forth or rocked by the levers into the different positions desired.

The several lock positions which should be provided for will be understood from the following: Ordinarily when all of the prisoners are present in the cells, all of the gate locks will be thrown to what may be termed the "gang-locked" position, that is, the position in which it is impossible to unlock any individual gate without first changing the position of the control mechanism. When the prisoners are to be released from the cells at the commencement of a day's work, all of the gates should be simultaneously unlocked, so that each prisoner may fully open his gate and pass out. This simultaneous unlocking of all of the gates should be accomplished by proper manipulation of the control mechanism. When all of the gates are thus opened, provision should be made for retaining them in fully opened position, so that when the prisoners return to the cells at the close of a day's work, confusion and disorder in the opening of some of the gates may be avoided. This condition should also be obtainable by proper manipulation of the control mechanism.

When all of the prisoners are in their cells, provision should be made for throwing the control mechanism into such a position that each gate may be individually unlocked by the use of a key at the gate, so as to permit any given prisoner to be removed without unlocking any of the other gates. This may be termed the "snap-locked" condition. This condition should be effected by proper manipulation of the control mechanism, and such manipulation should retain all of the gates locked, under the condition that any individual gate may be unlocked by the use of a key at that gate.

In order to permit keeping any particular prisoner in solitary confinement while allowing the other prisoners to pass freely in and out under the control of the proper official, there should be provision for throwing the lock of any particular gate into such condition that the manipulation of the control mechanism will not release said lock, while nevertheless permitting the remaining gates to be freely locked or unlocked. Certain of the aforementioned conditions may be effected by the use of constructions at present well known and in service.

I have previously stated that bars and levers can be conveniently used for effecting the connections from the control stations to the gangs of gates where said gangs are mounted in straight tiers, because such control can be effected by a straight back and forth movement, or a rocking of the bars. However, where the gates are to be mounted in circular or other than straight tiers, this form of construction is objectionable, for the reason that there will almost certainly be lost motion at the joints or bends or turns in the bars. Such joints are usually effected by the use of universal couplings. Any such lost motion will be cumulative, and when it is appreciated that the gates must be absolutely under the control of the proper official, it will be seen that the desired condition, that absolute certainty that all of the gates shall simultaneously be in the condition desired, cannot be obtained by such a construction.

One of the objects of the present invention is to provide an arrangement whereby any number of gates located either in straight or circular tiers or in any other arrangement may be perfectly controlled from a given station without the use of control bars or rods, but rather by the use of fluid pressure, which may be conducted in suitably formed and shaped pipes. In this way, the gates can all be simultaneously controlled by conveying the fluid pressure to any desired location, or locations.

Another object of the invention is to provide an arrangement such that by the use of fluid pressure any or all of the conditions heretofore outlined may be secured in the control of the various gate locks. A further object of the invention is to so arrange the parts that they will be of very simple and convenient construction, and of a construction which will not easily get out of repair or proper operative condition.

Many other objects and uses will appear from a detailed description of the invention, which consists in the features of construction and combinations of parts hereinafter described and claimed.

Referring to the drawings:

Figure 1 shows a fragmentary elevation of a portion of a tier of cells having applied thereto the features of the present invention;

Fig. 2 shows a detail cross section taken on line 2—2 of Fig. 4, looking in the direction of the arrows. This figure may also be considered as an enlarged section taken on line 2—2 of Fig. 1, looking in the direction of the arrows;

Fig. 3 shows a detail elevation of the locking bar of any given gate, and the pawl and associated parts which directly engage the same;

Fig. 4 shows an enlarged detail view of the door and locking mechanism for one gate, the front plate of the gate lock being removed so as to show its interior construction;

Fig. 5 shows an enlarged view similar to that of Fig. 2. This may also be considered as a section taken on line 5—5 of Fig. 6, looking in the direction of the arrows;

Fig. 6 shows a vertical section through the control cylinder and piston for manipulating the locking mechanism of any given gate;

Fig. 7 shows a plan view through a control valve for use in the control station;

Fig. 8 shows a vertical elevation corresponding to Fig. 7, with the exception that a portion of the structure is shown in section in Fig. 8;

Fig. 9 shows a fragmentary vertical section, taken on line 9—9 of Fig. 11, looking in the direction of the arrows;

Fig. 10 shows a vertical elevation of the control valve of Fig. 7, being an elevation substantially at right angles to that shown in Fig. 8;

Fig. 11 shows a horizontal section taken on line 11—11 of Fig. 10, looking in the direction of the arrows;

Fig. 12 shows a horizontal section taken on line 12—12 of Fig. 10, looking in the direction of the arrows;

Fig. 13 shows a horizontal section taken on line 13—13 of Fig. 10, looking in the direction of the arrows;

Figs. 14 to 19 inclusive show diagrammatically the positions of the component parts of the control valve, and the pistons or plungers for effecting six primary movements, as follows: Fig. 14 shows the position of the control valve for moving the plungers from the "ganglocked" or fully locked position to the fully unlocked position, the plunger being shown at the beginning of the movement; Fig. 15 shows the position of the control valve for moving the plungers from the fully unlocked to the "ganglocked" position, the plunger being shown at the fully unlocked position; Fig. 16 shows the position of the valve for moving the plungers from the "ganglocked" to the "snap-locked" position—that is, that position at which the lock of any particular gate may be controlled by a key independently of the remaining gates; Fig. 17 shows the position of the control valve for moving the plungers from the "snap-locked" to the fully unlocked position, the plunger being shown at the beginning of such movement; Fig. 18 shows the position of the control valve for moving the plungers from the fully unlocked to the "snap-locked" position, the plunger being shown at the beginning of said movement; Fig. 19 shows the position of the control valve for moving the plungers from the "snap-locked" to the "ganglocked" position, the plunger being shown at the beginning of such movement; Fig. 20 shows a section taken on the line 20—20 of Fig. 4, looking in the direction of the arrows; and Fig. 21 shows a section taken on the line 21—21 of Fig. 4, looking in the direction of the arrows.

I will first describe the construction of the gate locks and immediately adjacent parts, and will then describe the construction and operation of the control valve by which the various locks are simultaneously controlled.

Referring to Fig. 1, I have therein illustrated the front portions of two cells designated 21 and 22, each of which is provided with a gate 23 and a lock 24. A control valve 25 is mounted at any convenient position, and is connected to the various locks in the manner hereinafter described. The fluid controlled by the valve 25 may be oil, water, compressed air, or other gas, or any fluid which may be found suitable to the particular service. Ordinarily a non-compressible fluid, such as oil, will be used; but I wish it to be distinctly understood that I do not limit myself to the use of such a fluid. Under certain conditions it will be desirable to use an accumulator 26 in conjunction with a fluid pump 27 for maintaining a supply of fluid under sufficient pressure to secure proper operation of the plungers under control of the control valve.

Referring to Fig. 4, it is customary to provide a stationary bar 28, adjacent to which the gate is thrown when moved into the locked position, said bar ordinarily constituting a portion of the casing for the gate. The gate itself carries one or more locking hooks 29 which extend through openings in the bar 28 when the gate is closed. A bar 30 is slidable vertically with respect to the bar 28, said bar 30 having openings of sufficient size to pass the hooks 29 when the bar 30 stands in the unlocked position. When the bar 30 is moved into the locking position (ordinarily accomplished by lowering it), it engages the hooks 29 and thus locks the gate. For purposes of convenience only I will designate the bar 30 as the "locking bar". Adjacent to the bar 30 is another vertically slidable bar 31, whose function is to control the locking mechanism, and for purposes of convenience only I will designate the same as the "operating bar". The operating bar is conveniently located between the bar 28 and the locking bar 30, and the operating bar is provided with openings of sufficient size to permit the passage of the hooks 29 without interfering with the operation of said hooks.

The individual lock 24 has a vertically movable pawl 32 adapted to engage one of the hooks 29 (which I will designate 29ᵃ) when the gate is closed. The pawl 32 normally stands in lowered position, and a spring 33 provides additional security for the accomplishment of this result. The hook 29ᵃ extends through both the operating and locking bars and into the interior of the lock 24 when the gate is closed, without interfering with said bars. The hook 29ᵃ has a notch 29ᵇ adapted to engage the locking bar 30 when the same is in locked position. A pin 34 is slidably mounted in the lock 24 and works through the pawl 32 and between the locking bar and the operating bar. Said pin 34 works nicely through a hole in the locking bar 30, and works loosely in a slot 34ᵃ in the operating bar 31. In the position shown in Fig. 4, the upper end of the said slot bears against the pin 34, but the operating bar may rise to the snaplocked position before the lower end of the slot bears against the pin 34. When said pin is projected into the position shown in Fig. 4, it provides an operating connection between the operating bar, the locking bar and the pawl 32, but when it is drawn inwardly it disengages from the operating bar, so that said bar may travel vertically its full amount of travel without simultaneously moving the locking bar. At all times, however, the pin 34 locks the pawl 32 to the locking bar. The pin 34 carries a loop 35, by means of which it may be moved back and forth. A "deadlock" 36 is connected to the loop 35 by a trigger 37, so that the pin 34 may be moved back and forth by the operation of a key in the deadlock 36. When said deadlock is thrown into one position, the pin 34 is driven out into the position shown in Fig. 4, whereas, by turning the "deadlock" key, the pin 34 is drawn back, so as to completely disengage the pin from the locking bar. The pawl 32 has an extension 38 whereby it may be operated from a snaplock 39. By the operation of a key in this snaplock, the pawl 32 may be raised or lowered so as to cause it to engage with or disengage from the hook 29ᵃ as desired. Such raising and lowering will simultaneously raise and lower the locking bar 30.

A stop 39ᵃ is placed behind and slightly above the loop 35. When the said loop with the pin 34 stands in the projected position shown in Fig. 4, the loop may rise past the stop, but when the loop and pin are withdrawn by operation of the deadlock 36, the loop and pin are prevented from rising by reason of the presence of the stop 39ᵃ. Thus it is possible to raise and lower the loop 35 and pin 34 by operation of the snaplock 39 when said loop and pin stand in the projected position, but when they are withdrawn by operation of the deadlock 36 they cannot be raised.

Connected to the upper portion of the gate is a ratchet bar 40 having teeth 41. The locking bar has an extension 42, on which is mounted a pawl 43 adapted to engage the teeth 41. Said pawl operates within a slot on the extension 42, and said slot is so proportioned that when the locking bar is fully raised, the pawl will be raised so as to completely disengage it from the ratchet 40, thereby permitting free movement of said ratchet back and forth. On the other hand, when the locking bar is lowered, the pawl 43 will freely engage the ratchet, so that, as the gate is closed when the locking bar is in lowered position, the pawl will successively engage the several ratchet teeth. The pawl and slot are so proportioned that when the locking bar is raised only to the "snaplock" position, the pawl will nevertheless engage the rack.

The ratchet is also provided with a squared notch 44 in one portion of its upper face, and with a similar notch 44ª in another portion of its upper face. The operating bar 31 carries an extension 45, which extends upwardly and has the ear or lug 46 adapted to engage one or the other side of the notches 44 and 44ª. This lug, therefore, serves to lock the gate either in the fully opened position or in the locked position at those times when the operating bar is fully lowered, while the gate is in the one or the other of such positions. The parts are so proportioned that when the operating bar 31 is thrown into the snap-locked position, the lug 46 will clear both of the notches 44 and 44ª, and the teeth of the ratchet. However, as previously explained, the pawl 43 will engage the ratchet when the locking bar stands in snaplocked position.

Inasmuch as the bar 40 must be so formed as to permit of the complete lowering of the operating bar when the gate is fully closed, I prefer to make provision for the accommodation of the lug 46 at such time by forming the bar 40 with the notch 44ª above mentioned. Thus said notch serves the double function of making provision for the accommodation of the lug 46 when the operating bar is fully lowered with the gate in closed position, and of providing an additional lock for securing the gate in the closed position. Inasmuch as the space wherein the lug 46 travels is easily inclosed by means of plates and secret fastenings such as are well known in the art, it follows that the locking effect of the engagement of the lug 46 with the notch 44ª is effected within an inclosure to which the prisoner cannot gain access.

I will now explain the operation of the mechanisms above described, before proceeding with a description of the remaining mechanisms. The operating bar is under the control of the proper official from the control station, and it may occupy either the fully lowered or "ganglocked" position, the partially raised or "snaplocked" position, or the fully raised or "unlocked" position. I will first assume that the deadlock 36 is thrown into the position shown in Fig. 4. Under these conditions, the pin 34 is driven out, so that the locking bar 30 rises and falls in a certain relation to the movements of the operating bar 31. Under these conditions, a raising of the operating bar to the central or snaplocked position will not raise the locking bar out of locking position. In consequence, the gate will no longer be gang-locked, although it will still be locked by all of the locking mechanisms, except those directly connected with the operating bar. At such time, the snaplock 39 may be operated by its key, so as to raise the pawl 32 away from the hook 29ª, and simultaneously raise the locking bar from the locked position, and thus permit the individual opening of the gate without unlocking the remaining gates. Under such circumstances, the prisoner may be taken into or out of the cell without disturbing the locked condition of the remaining cells. If, however, the operating bar be fully raised to the unlocked position, the pawl 32 will be raised away from the hook 29ª by the engagement of the lower end of the slot 34ª with the pin 34, so that the cell in question, as well as all of the other cells of the gang will be fully unlocked. Under this condition, all of the gates may be thrown into the open position without recourse to the use of keys in the snaplocks of the individual cells.

Assuming that certain of the cell gates are fully opened, a restoration of the operating bars to their fully lowered positions will cause the lugs 46 of the individual operating bars to engage the notches 44 of the individual ratchet bars, so as to lock the gates in the open position and thus insure that the gates will be fully opened when the prisoners are to be returned to the cells.

If, however, an operating bar be moved only to the central or snaplocked position, the locking bar will nevertheless be fully lowered. This will bring the pawl 43 into engagement with the ratchet 40 and will also bring the opening of the locking bar into locking alinement with respect to the hook 29 and will also bring the pawl 32 into locking alinement with the hook 29ª. Under these conditions, if such individual gate be moved in the closing direction, the rack 40 will ride under the pawl 43, so as to lock the gate in a step-by-step manner until finally, when the gate is fully closed, the hooks 29 will force themselves through the openings of the locking bar, and the hook 29ª will force itself beneath the pawl 32, the locking bar rising sufficiently to permit such action, and the gate will thus be fully locked. Thereupon, a further lowering of the operating bar to the ganglocked position will take up the lost motion of the slot 34ª, so that thereafter the locking bar cannot be raised without raising the operating bar.

Assuming, on the other hand, that the deadlock 36 is so manipulated as to withdraw the pin 34 from engagement with the operating bar, it will be evident that the rising and falling of the locking bar will not in itself influence the rising and falling of the operating bar. In other words, the operation of the locking bar will be made independent of the operating bar. Thus, the rising and falling of the operating bar will not lock or unlock the gate when the pin 34 is withdrawn by means of the deadlock 36. Frequently the warden or his deputy desires to place a prisoner under his own personal control, so that the other attendants cannot release such prisoner. In such cases, the deadlocks 36 will be of a different combination from the snaplock 39, so that the snaplock keys will not operate the deadlock.
The warden, by withdrawing the pin 34, by operation of the deadlock, will place it beyond the control of any unauthorized person to open the gate; because, when the pin 34 has been withdrawn, the stop 39ᵃ will prevent the rising of the loop 35, and this will also prevent the raising of the latch 34 by operation of the snaplock 39.

In carrying into effect the features of the present invention, I make use of fluid pressure for bringing the operating bar into either of the desired positions, namely: the fully lowered or ganglocked position, and the fully raised or snaplocked position, and the fully central or unlocked position. I will now describe the particular construction of mechanism herein illustrated for carrying into effect this feature of the present invention.

At a suitable point with respect to each operating bar there is mounted a cylinder 47 within which works the piston or plunger
48. The piston is connected to the operating bar in any suitable manner, as by means of a piston rod 49, and an offset lug 50. Connected to the various cylinders which are to be controlled from a given station, are the fluid pipes 51, 52, and 53. These pipes preferably extend along adjacent to the upper portion of the cells to be controlled, and are conveniently located immediately above the several cylinders. The several pipes 51, 52, and 53 lead to the control valve 25, from which they receive fluid under pressure for operating the pistons, and to which they discharge said fluid from the back or exhaust sides of said pistons.

The control valve may be of any convenient construction, but in the arrangement illustrated I have shown the same as including the casing 54 and the rotatable plug 55 in said casing. The plug 55 has a lever 56 by which it position of the piston, still it is found more convenient in the construction of the control valve to have two snaplocked positions of the lever, one corresponding to the position of said lever for the movement from unlocked to snaplocked, and the other for the movement of piston from ganglocked to snaplocked. I, therefore, provide a hole 62 for the first of said movements and the hole 63 for the second of said movements. For purposes of convenience, these are indicated by lettering on Fig. 7 of the drawing.

The control valve is preferably provided with ports and connections in three levels, which I designate "lower", "intermediate", and "upper". The sections shown in Figs. 11, 12, and 13 are taken at upper, intermediate, and lower levels, respectively, on the operating side of the valve casing. The three pipes 51, 52, and 53, respectively, enter the valve casing at points 64, 65, and 66, respectively, as shown in Figs. 11, 12, and 13. The connections 64, 65, and 66 communicate with the passages 67, 68, and 69, respectively, which passages extend throughout the height of the three levels of the valve. All of the passages 67, 68, and 69 communicate. The ports 70, 71, and 72 in the upper level. The passage 68 communicates with a port 72 the intermediate level by means of a connection 74, and the passage 69 communicates with a port 75 in the intermediate 76 by means of a cross connection riser 77. The passage 78 in the lower level by means a port 78 in the lower level by a downward cross connection 74 and a downward tending connection 79 from the cross 74, and the passage 69 communicates port 80 in the lower level by means cross connection 76. Therefore, tion 68 always communicates with 70, 73, and 78 of the upper, intermediate lower levels, respectively; the always communicates with the passage the upper level; and the port communicates with the port of the upper, intermediate, respectively.

On the discharge side of vertical connection 81 co 82 in the upper the port 97, and the port 104 will fully register with the port 98. At such time also the port 101 is just ready to commence communication with the port 95, so that upon the slightest upward movement of the piston, fluid may discharge through said ports. Similarly in this position the port 103 is just ready to commence communication with the port 96, so that upon the slightest downward movement of the piston, fluid may discharge from the lower portion of the cylinder through these ports. The ports 101 and 95, and the ports 103 and 96 may also be so adjusted as to have a slight amount of lead in the upward and downward movements, respectively.

Examination of the valve diagrams contained in Figs. 14 to 19, inclusive, will disclose the following plunger operations corresponding to said figures, respectively: Assuming the plunger to stand in the ganglocked position and that it is desired to move the same to the unlocked position, the valve may be thrown into the position shown in Fig. 14. Fluid under pressure entering from the port 82 flows by way of port 88 and nozzle 90, to port 72; thence by connection 69 and pipe 53 to port 98. The piston being in the lowermost position, fluid would attempt to discharge through port 96, but examination of the valve diagram of Fig. 14 shows that pipe 51 to connection 67, and all the ports communicating with said connection are cut off or closed with the valve in the position shown in said figure. Therefore, an upward pressure will be exerted on the lower face of the piston. However, the port 97 will discharge fluid from the upper portion of the cylinder through pipe 52 and connection 68 to port 73 of the intermediate level, and thence through nozzle 91 and port 90, and port 84 to the discharge connection 83. This will permit the piston to rise, and such rise may continue to the fully opened or unlocked position.

Considering Fig. 15 in which the piston stands in the fully raised or unlocked position, the valve in said figure in order to move the piston to the fully lowered or ganglocked position. Placing the valve in this position, fluid under pressure passes from the port 82 and by way of the port 88 and nozzle 89 to the connection 68, and thence through pipe 52 to port 97. There will be an attempt on the part of the fluid to escape from the upper portion of the cylinder by way of port 95, but examination of Fig. 15 shows that all of the valve ports communicating with pipe 51, which is the pipe communicating with port 95, are closed. Therefore, pressure will be exerted upon the upper face of the piston. Fluid may discharge from the lower portion of the cylinder by way of the port 98, through Referring to Figs. 14 to 19 inclusive, the lower portions of said figures indicate diagrammatically the constructions of the ports both in the valve casing and in the valve plug at three levels. In the upper level, the plug is provided with a supply port 88, having a nozzle 89; in the intermediate level the plug is provided with a discharge port 90, having a nozzle 91; and in the lower level the plug is provided with a discharge port 92 having the nozzles 93 and 94. The port 88 works between the nozzles 93 and 94. The port 88 works between the port 82 and the ports 70, 71, and 72; the port 90 works between the port 84 and the ports 73 and 75; and the port 92 works between the port 85 and the ports 78 and 80.

Referring to Fig. 6 in particular it will be seen that the pipe 51 communicates with the upper and lower portions of the cylinder the connections 95 and 96. It will also be observed that the pipe 52 communicates with another portion of the upper part of cylinder by a connection 97 and that the 53 communicates with another part of ver portion of the cylinder by the connection 98. In that figure the piston is in its fully lowered or ganglocked the upper portion of the piston e flange 99 and its lower portion e flange 100. The flange 99 has 101 and 102 adapted to register with the ports 95 and 97, and 0 has ports 103 and 104, adapted respectively with the ports 96 en the piston is fully lowered, egisters with the port 96 and egisters with the port 98. At ion the port 101 is completely y to communicate with the upon the slightest upward portion of the cylinder 102 and 97. In fact, it esirable to have a slight ween these ports even lly lowered.

101 fully raised or In this same position off from the port 96, ready to commence port 98, so that ward movement of ence to flow from cylinder through fact, it may be ount of lead be- the central po- register with the cylinder which the discharge from the valve would be disposed of in any other desired manner, as, for example, by discharging directly to the atmosphere.

pipe 53 to connection 69, and thence by way of port 75 through nozzle 91 and port 90 to port 84 and thence to the discharge connection 83. These various connections are so proportioned that the piston may travel downward the entire distance necessary to move from fully unlocked to ganglocked position.

It might be thought that, in either of the two preceding operations shown diagrammatically in Figs. 14 and 15, there might be a transfer of fluid under pressure directly from one face of the piston to the other by way of the ports 95 and 96. This, however, is prevented by reason of the fact that, in the travel of the piston in either direction, one or the other of said ports is closed to all practical intents and purposes before the other is opened, so that in practice no appreciable amount of fluid transfer can take place even in those constructions where the piston is given a certain amount of lead.

Considering next the position shown diagrammatically in Fig. 17, the movement therein depicted is from snaplocked position to fully unlocked position, and the valve is thrown into the same position as that shown diagrammatically in Fig. 14. It is not considered necessary to describe this movement in detail, inasmuch as it is but a partial movement which is fully described in connection with Fig. 14. Considering likewise the positions shown diagrammatically in Fig. 19, these are for the movement from snaplocked position to ganglocked position, and for this purpose the valve is thrown into the same position as that depicted in Fig. 15. Inasmuch as the movement depicted in Fig. 19 is but a portion of the complete movement described in connection with Fig. 15, it is deemed unnecessary to describe the operations depicted in Fig. 19 in detail.

Considering next the arrangement shown diagrammatically in Fig. 16, the valve position therein shown is for the movement from ganglocked position to snaplocked position, and in this case the movement of the piston is to be arrested before it has traveled the full distance upward. With the valve in the position shown diagrammatically in said figure, fluid under pressure enters from the port 82 into the port 88 and travels by way of the nozzle 89 to the connection 67. Thence it travels through the pipe 51 to the ports 95 and 96. The port 95 being closed, fluid pressure is for the time being cut off from the upper face of the piston, but is exerted against the lower face thereof. There will be a tendency for fluid to leak through the port 98, and by way of the pipe 53 to the connection 69, but inspection of Fig. 16 shows that for the position therein depicted all of the ports communicating with connection 69 are closed. Therefore, there will be an upward pressure exerted on the piston. Fluid will leak from the upper portion of the cylinder by way of the port 97 and pipe 52 to the connection 68. Thence it will travel by way of the port 78 and nozzle 93 to the port 92, and thence to the port 85. From the port 85 it will be discharged through the connection 83. The upward movement of the piston will continue until the flange 100 closes the port 96, whereupon the supply of fluid under pressure will be arrested. In fact, any further travel of the piston upward will uncover the port 95, so as to exert a downward pressure on the piston. Thus the piston will be positively locked in the central or snaplocked position.

Considering the positions in Fig. 18, the same is for a travel from fully unlocked to snaplocked position. In this case the valve is thrown into the position shown in said figure. Fluid under pressure coming from the port 82 travels by way of port 88 and nozzle 89 to the connection 67. Thence it travels by way of pipe 51 to ports 95 and 96. A flow of fluid through the port 97 is prevented for the reason previously disclosed in connection with a study of the arrangement shown in Fig. 15, so that a downward pressure is exerted on the piston. Fluid will pass out from the lower portion of the cylinder through the port 98, and pipe 53 to the connection 69. From this connection it will pass by way of port 80, nozzle 94 and port 92 to port 85, whence it will be discharged through the connection 83. The downward movement of the piston will be arrested in the central position for a reason similar to that previously outlined in connection with a study of the position shown in Fig. 16.

It will be observed that the piston movements controlled by the fluid pressure serve to position the operating bars of the several gate mechanisms into those several positions wherein the gate-lock mechanisms are capable of performing the various functions which it is desired that they should perform. It will also be observed that, upon throwing the control valve into any one of the several positions enumerated, all of the pistons of the gang are simultaneously subjected to fluid pressures of the same kind. Consequently all of the pistons will move simultaneously to the desired position, and the uncertainty, due to lost motion in a series of link or bar connections, is wholly eliminated. The addition or substraction of locking mechanisms to or from the gang will in nowise interfere with the proper functioning of the other locking mechanisms on the gang, but will simply cause a greater or less total flow of fluid through the control valve and pipes. By making the control valve and pipes of ample capacity, the flow of fluid into all of the cylinders will be practically instantaneous, so that very quick movements will be secured in all of the cylinders.

It will also be observed that the arrangement disclosed is such that each piston will be fluid locked in the position to which it moves, so that, as long as a supply of fluid pressure is maintained on the system, assurance will be had that all of the locking mechanisms will remain in the position ascertained by the position of the control valve. The use of an accumulator or storage reservoir in conjunction with a fluid pump will give very great certainty of the maintenance of fluid pressure on the system at all times.

In many cases, other forms of fluid than oil or water may be used with equal advantage in carrying into effect the features of invention disclosed herein. For example, I will enumerate air, gas, electricity, etc., as being other forms of fluid which might be used with slight modifications of mechanical structure in some cases, but without departing from the spirit of the invention herein disclosed. Therefore, where I use the term "fluid" or the like, it will be understood that I contemplate any suitable form of pressure mechanism usable for the purpose.

I claim:

1. In a jail locking mechanism, the combination with a plurality of cell gates, of locking devices on each cell gate, a vertically movable locking bar in conjunction with the locking devices of each cell gate, each locking bar when in one position coöperating with the corresponding locking devices for the purpose of locking the gate, and when in another position disengaging from the locking position to unlock the gate, a vertically movable operating bar corresponding to each locking bar, an operative connection from each operating bar to the corresponding locking bar for the purpose of deadlocking the locking bar when the operating bar is in one position, permitting the locking bar to be unlocked when the operating bar is in snap-locked position, and unlocking the locking bar when the operating bar is in unlocked position, a fluid cylinder corresponding to each operating bar, a piston in each cylinder, an operative connection from each piston to the corresponding operating bar for the purpose of positively moving each operating bar according to the movements of its piston, fluid pipes connected into both ends of each cylinder, fluid pressure mechanism, and a fluid controlling valve interposed between said pipes and said pressure mechanism for the purpose of selectively delivering fluid under pressure through selected pipes simultaneously to all of the cylinders in similar manner, for the purpose of thereby positively moving all of the pistons under fluid pressure into desired position, substantially as described.

2. In a jail locking mechanism, the combination with a plurality of cell gates, of locking devices on each gate, a locking bar corresponding to each gate, each locking bar when in one position serving to lock the gate and when in another position unlocking from the gate, a fluid cylinder corresponding to each locking bar, a piston within each cylinder, operative connections between each piston and the corresponding locking bar for the purpose of deadlocking the locking bar when the piston is at one extreme limit of movement, permitting disengagement of the locking bar from the locking devices of its gate when the piston is at an intermediate position, and positively disengaging the locking bar from the locking devices of its gate when the piston is at the other extreme limit of its movement, fluid pipes in conjunction with all of the cylinders for the purpose of delivering fluid under pressure to the ends of the cylinders as desired, fluid pressure mechanism, and a suitable control valve interposed between the pipes and the fluid pressure mechanism for selectively delivering fluid under pressure into the different pipes to thereby positively move and retain the various pistons simultaneously in selected positions, substantially as described.

3. In a jail locking mechanism, the combination of a plurality of cell gates, a locking bar for each gate, a locking device on each gate for engagement with the corresponding locking bar, each locking bar when in one position serving to lock the corresponding gate and when in another position serving to unlock said gate, a fluid cylinder corresponding to each gate, a piston in each cylinder, an operative connection from each piston to the corresponding locking bar serving when the piston is at one extreme limit of movement to positively lock the gate, and when the piston is at the other extreme limit of movement to positively unlock the gate, and when the piston is at an intermediate position to also lock the gate, fluid pressure pipes in communication with both ends of each cylinder, and means under the control of the operator for selectively admitting fluid under pressure to the different pipes for the purpose of thereby positively moving the pistons into selected positions as desired under fluid pressure, substantially as described.

4. In a jail locking mechanism, the combination with a plurality of cell gates, of locking devices in conjunction with each gate, including an operating bar therefor, a fluid pressure cylinder for each gate, a piston in each cylinder, an operative connection from each piston to the corresponding operating bar, fluid pressure connections to both ends of each cylinder, and means under the control of the operator for selectively delivering fluid under pressure into the desired pipes to thereby move the various pistons into selected positions under the fluid pressure, substantially as described.

5. In a jail locking mechanism, the combination of a plurality of cell gates, locking devices for each gate, including an operating bar having three definite operative positions, fluid pressure cylinders in conjunction with the operating bars, pistons in the cylinders, operative connections from the pistons to the bars, fluid pressure connections to both ends of the cylinders, and means under the control of the operator for selectively admitting fluid under pressure into the ends of the cylinders for the purpose specified.

FOLGER ADAM.

Witnesses:
 THOMAS A. BANNING, Jr.,
 FRANCES M. FROST.